United States Patent [19]

Logemann

[11] 3,718,717
[45] Feb. 27, 1973

[54] ACRYLONITRILE COPOLYMER THREADS AND FILMS CONTAINING A POLYMER OF VINYL METHYL FORMAMIDE

[75] Inventor: Heino Logemann, Leverkusen, Germany

[73] Assignee: Bayer Aktiengesellschaft, Leverkusen, Germany

[22] Filed: Sept. 24, 1971

[21] Appl. No.: 183,669

[30] Foreign Application Priority Data

Sept. 25, 1970 Germany..................P 20 47 248.4

[52] U.S. Cl...............260/898, 260/89.7 R, 264/288
[51] Int. Cl...............................................C08f 29/56
[58] Field of Search..........................260/898, 89.7 R

[56] References Cited

UNITED STATES PATENTS 3,316,224  4/1967  Bestain et al.......................260/85.5
3,597,314  8/1971  Laube et al...........................162/168
2,652,378  9/1953  Caldwell..............................260/30.4
2,831,826  4/1958  Coover et al........................260/32.8

Primary Examiner—Murray Tillman
Assistant Examiner—C. J. Seccuro
Attorney—Plumley & Tyner

[57] ABSTRACT

Threads and films of acrylonitrile copolymers which contain 20 to 80 percent by weight of vinylidene chloride and/or vinyl chloride, which threads and films are free from vacuoles. The formation of vacuoles in threads or films of copolymers of acrylonitrile containing 20 to 80 percent by weight of vinylidene chloride and/or vinyl chloride can be substantially reduced or even completely prevented by adding homopolymers of vinyl methyl formamide or copolymers of vinyl methyl formamide with up to 90 mols percent of vinyl esters or acrylic acid esters to the spinning solutions of acrylonitrile copolymers and organic solvents in an amount of 0.5 to 20 percent by weight, based on the copolymer of acrylonirile and vinylidene chloride and/or vinyl chloride.

6 Claims, No Drawings

ACRYLONITRILE COPOLYMER THREADS AND FILMS CONTAINING A POLYMER OF VINYL METHYL FORMAMIDE

This invention relates to threads and films of acrylonitrile copolymers which contain 20 to 80 percent by weight of vinylidene chloride and/or vinyl chloride, which threads and films are free from vacuoles.

In the production of threads or films from copolymers of acrylonitrile with vinylidene chloride and/or vinyl chloride it has been found a disadvantage that the products obtained contain vacuoles. The vacuoles cause the threads and films to have a more or less matt appearance if they are treated with water or steam at elevated temperature. Shaped articles such as threads are inevitably exposed to the action of hot water or steam in the course of processing, e.g., threads when they are being stretched and crimped, the resulting yarns when they are being dyed and the finished fabrics when they are being washed and ironed. The matt appearance caused by the vacuoles cannot be controlled and is obviously strongly influenced by the external conditions, i.e., the intensity and temperature at which the products are exposed to water, so that the articles produced from the threads or films have an uneven appearance.

It has now been found that the formation of vacuoles in threads or films of copolymers of acrylonitrile containing 20 to 80 percent by weight of vinylidene chloride and/or vinyl chloride can be substantially reduced or even completely prevented be adding homopolymers of vinyl methyl formamide or copolymers of vinyl methyl formamide with up to 90 mols percent of vinyl esters or acrylic acid esters to the spinning solutions of acrylonitrile copolymers and organic solvents in an amount of 0.5 to 20 percent by weight, based on the copolymer of acrylonitrile and vinylidene chloride and/or vinyl chloride.

This invention, therefore, relates to threads and films of a polymeric composition of:
a. 99.5 to 80 percent by weight of an acrylonitrile copolymer which comprises 20 to 80 percent by weight of vinylidene chloride and/or vinyl chloride, and
b. 0.5 to 20 percent weight of at least one homopolymer of N-vinyl-N-methyl formamide and/or of copolymers of this compound with vinyl esters or acrylate esters.

The vinyl esters used are preferably vinyl esters of low aliphatic fatty acids, and the acrylic acid esters used are preferably esters of acrylic acid with $C_1-C_6$-aliphatic alcohols, preferably $C_1$ to $C_4$ alcohols. The molecular weight of the homopolymers or copolymers added according to the invention may vary within wide limits. Generally speaking, polymers having K values (according to H. Fikentscher, Cellulose Chemie 13 (1932) p. 58) of between 2 and 100 are effective. Polymers which have a K value of 25 to 40 are particularly suitable. The polymers of vinyl methyl formamide may be prepared e.g., according to DAS No. 1,246,248 but no special method of preparation is claimed here. The monomer N-vinyl methyl formamide may be prepared e.g., according to DAS No. 1,235,983 from N-(-methoxyethyl)-N-methyl-formamide which is prepared according to DAS No. 1,273,533.

Moreover this invention relates to a process for the production of a thread or film which comprises mixing
a. 99,5 to 80 percent by weight of an acrylonitrile copolymer which comprises 20 to 80 percent by weight vinylidene chloride and/or vinyl chloride, and
b. 0.5 to 20 percent by weight of at least one homopolymer of N-vinyl-N-methyl formamide and/or of copolymers of this compound with vinyl esters or acrylate esters and spinning said mixture from solution into a thread or film.

The organic solvents used for the preparation of the spinning solutions of the mixtures according to the invention may be the usual polar solvents used for polyacrylonitrile, such as dimethyl formamide, dimethyl acetamide, ethylene carbonate, α-butyrolactone, dimethyl sulphoxide or hexamethyl phosphoric acid traimide. Other solvents such as acetone and tetrahydrofuran may also be used.

The test for determining the stabilizing effect of the homopolymers and copolymers against the formation of vacuoles is carried out as follows:

Films of acrylonitrile copolymers containing vinylidene chloride and/or vinyl chloride and films produced from the mixture of acrylonitrile copolymer (a) with copolymer (b) are stretched to 4 times their length and then treated as follows:
1. Boil 1 hour in water at 100° C
2. then dry 1 hour at 50° C
3. temper for 20 minutes at 140° C
4. boil 1 hour in water at 100° C, and
5. dry for 30 minutes at 50° C.

The following results are obtained on testing a film of a copolymer a) without the addition of b):

| Treatment Stage | Appearance of film |
| --- | --- |
| 1 | whitish cloudy |
| 2 | whitish cloudy |
| 3 | clear |
| 4 | whitish cloudy |

If the addition of a substance which stabilizes against vacuoles is effective then distinctly clearer films are obtained even at stages 1 and 2 and especially after completion of stage 4 of the above treatment. Threads behave in the respect in the same way as films.

The addition of the copolymers according to the invention also has advantageous effects on other properties of the basic copolymer of acrylonitrile and vinylidene chloride and/or vinyl chloride. For example, the increased gloss of the threads and films results in a more brilliant color tone when the threads and films are dyed and the color appears to be more intense.

In the following Examples, parts by volume are related to parts by weight as liters to kilograms. The K value is determined according to the method of Fikentscher, Cellulose chemie, 13 (1932), 58.

PREPARATION OF N-VINYL-N-METHYL FORMAMIDE POLYMERS

A. Five parts by weight of N-vinyl-N-methyl formamide and 0.1 part by weight of azodiisobutyric acid dinitrile in 30 parts by volume of tertiary butanol are heated to 80° C with stirring in a nitrogen atmosphere. Within a short time, the polymer is deposited in the form of white flakes which continuously increase in amount so that a fine-grained precipitate permeates the whole liquid, at which point it is advisable to stop the stirrer. After a total heating time of 8 hours, the product is introduced into petroleum ether and washed with petroleum ether. A total of 100 parts by volume of petroleum ether are used. After drying at 40° C under vacuum, the homopolymer is obtained in a yield of 94 percent with a K value of 23, determined in dimethyl formamide with the addition of 1 percent of sodium sulphate as solvent at 25° C.

B. 8.5 Parts by weight of N-vinyl-N-methyl formamide, 8.6 parts by weight of vinyl acetate and 0.5 part by weight of azodiisobutyric acid dinitrile in 80 parts by volume of tertiary butanol are heated to 80° C in a nitrogen atmosphere with stirring. The reaction mixture becomes a thick liquid within a short time and is kept at C for 9 hours with stirring. Most of the polymer precipitates on cooling. The product is worked up by reheating the reaction mixture to 80° C for 24 hours and precipitating the product by stirring the mixture into petroleum ether, washing with petroleum ether and drying under vacuum at 40° C. The yield is 77 percent, the K value determined in dimethyl formamide is 25.

C. 8.5 Parts by weight of N-vinyl-N-methyl formamide, 8.6 parts by weight of methyl acrylate and 0.5 part by weight of azodiisobutyric acid dinitrile in 80 volumes of tert-butanol are heated to 80° C in a nitrogen atmosphere with stirring. The reaction mixture becomes cloudy in about 45 minutes and progressive precipitation of polymer begins. After 9 hours heating at 80° C, the product is worked up as in Example 2. A product having a K value of 31 in dimethyl formamide is obtained in a yield of 83 percent.

The following Examples are to further illustrate the invention without limiting it.

EXAMPLE 1

10 percent Solutions in dimethyl formamide of a copolymer of 65 parts by weight of acrylonitrile, 35 parts by weight of vinylidene chloride and 1 part by weight of methacryloyl-aminobenzene-benzene-disulphonimide are prepared with and without the homopolymer of N-vinyl-N-methyl formamide described under (A), the quantities of homopolymer added being 2, 4, 7.5 and 10 percent by weight. The films produced from these solutions and dried at 50° C are made up into strips 10 mm in width which are stretched in the ratio of 1:4, boiled in water for 1 hour, dried at 50° C for 1 hour, tempered at 140° C for 20 minutes, again boiled in water for 1 hour and dried at 50° C for ½ hour. The matting is assessed as follows:

|  | Films boiled one hour moist | dried | Tempered at 140°C | Boiled one hour and dried 30 min. |
| --- | --- | --- | --- | --- |
| without additive | cloudy | cloudy | almost clear | cloudy |
| with 2% | slightly cloudy | almost clear | clear | clear |
| with 4% | almost clear | clear | clear | clear |
| with 7.5% | clear | clear | clear | clear |
| with 10% | clear | clear | clear | clear |

A pronounced effect is thus already achieved with the addition of 2 percent of the homopolymer.

EXAMPLE 2

10 percent Solutions in dimethyl formamide of a copolymer of 65 parts by weight of acrylonitrile, 35 parts by weight of vinyl chloride and 1 part by weight of methacryloyl-aminobenzene-benzene-disulphonamide are prepared with and without the copolymer of 1 mol of N-vinyl-N-methyl formamide and 1 mol of vinyl acetate described under (B), the quantities of the added copolymer used being 2, 4, 7.5 and 10 percent by weight. Films produced from these solutions and dried at 50° C are made up into strips 10 mm in width which are stretched in the ratio 1:4, boiled in water for 1 hour, dried at 50° C for 1 hour, tempered at 140° C for 20 minutes, again boiled in water for 1 hour and dried at 50° C for ½ hour. The matting is assessed as follows:

|  | Film boiled one hr. moist | dried | Tempered at 140°C | Boiled one hour and dried 30 min. |
| --- | --- | --- | --- | --- |
| without additive | cloudy | cloudy | almost clear | very cloudy |
| with 2% | slightly cloudy | slightly cloudy | clear | cloudy |
| with 4% | clear | clear | clear | almost clear |
| with 7.5% | clear | clear | clear | clear |
| with 10% | clear | clear | clear | clear |

The addition of 2 percent of the copolymer already achieves a pronounced effect which is even greater with higher doses.

EXAMPLE 3

10 percent Solutions in dimethyl formamide of a copolymer of 65 parts by weight of acrylonitrile, 35 parts by weight of vinylidene chloride and 1 part by weight of methacryloyl-aminobenzene-benzene-disulphone imide are prepared with and without the copolymer of 1 mol of N-vinyl-N-methyl formamide and 1 mol of methyl acrylate described under (C), the quantities of the added copolymer used being 2, 4, 7.5 and 10 percent by weight. The films produced from these solutions and dried at 50° C are made up into strips 10 mm in width which are stretched in the ratio of 1:4, boiled in water for 1 hour, dried at 50° C for 1 hour, tempered at 140° C for 20 minutes, again boiled in water for 1 hour and dried at 50° C for ½ hour. Matting is assessed as follows:

|  | films boiled one hr. moist | dried | Tempered at 140°C | Boiled one hour and dried 30 min. |
| --- | --- | --- | --- | --- |
| without additive | cloudy | cloudy | almost clear | very cloudy |
| with 2% | slightly cloudy | slightly cloudy | clear | slightly cloudy |
| with 4% | slightly cloudy | almost clear | clear | almost clear |
| with 7.5% | clear | clear | clear | clear |
| with 10% | clear | clear | clear | clear |

The addition of 2 percent of the copolymer already produces a pronounced effect which is increased with increasing doses.

I claim:

1. A thread or film of a polymeric composition of:

a. 99.5 to 80 percent by weight of an acrylonitrile copolymer which comprises 20 to 80 percent by weight of vinylidene chloride or vinyl chloride, and
b. 0.5 to 20 percent by weight of homopolymer of N-vinyl-N-methyl formamide or a copolymer of N-vinyl-N-methyl formamide with vinyl ester or acrylate ester or mixtures of said homopolymer and copolymer.

2. A thread or film as claimed in claim 1 in which component
   a. contains up to 5 percent by weight of a monoolefin which comprises acid or basic functional groups.

3. A thread or film as claimed in claim 2 in which the said monoolefin is present in an amount of 0.5 to 2 percent by weight.

4. A thread or film as claimed in claim 1 in which component
   b. has a K value of 2 to 100.

5. A thread or film as claimed in claim 4 in which the K value is between 25 and 40.

6. A process for the production of a thread or film which comprises mixing
   a. 99.5 to 80 percent by weight of an acrylonitrile copolymer which comprises 20 to 80 percent by weight of vinylidene chloride or vinyl chloride, and
   b. 0.5 to 20 percent by weight of a homopolymer of N-vinyl-N-methyl formamide or a copolymer of N-vinyl-N-methyl formamide with vinyl ester or acrylate ester, or mixtures of said homopolymer and copolymer and spinning said mixture from solution into a thread or film.

* * * * *

UNITED STATES PATENT OFFICE
CERTIFICATE OF CORRECTION

Patent No. 3,718,717           Dated February 27, 1973

Inventor(s) Heino Logemann

It is certified that error appears in the above-identified patent and that said Letters Patent are hereby corrected as shown below:

Column 3, line 18, "C" should read ---$80°C$---.

Signed and sealed this 19th day of November 1974.

(SEAL)
Attest:

McCOY M. GIBSON JR.           C. MARSHALL DANN
Attesting Officer             Commissioner of Patents